US005381172A

United States Patent [19]

Ujita et al.

[11] Patent Number: 5,381,172

[45] Date of Patent: Jan. 10, 1995

[54] INK JET HEAD CARTRIDGE, INK TANK CARTRIDGE USING DEGRADEABLE PLASTIC AS PART OF CONSTRUCTION OR PACKAGE THEREOF AND INK JET APPARATUS HAVING FITTING PART FOR THE CARTRIDGES

[75] Inventors: Toshihiko Ujita, Yamato; Hirotaka Kozawa, Kawasaki, both of Japan

[73] Assignee: Canon Kabushiki Kaisha, Tokyo, Japan

[21] Appl. No.: 802,489

[22] Filed: Dec. 5, 1991

[30] Foreign Application Priority Data

Dec. 7, 1990 [JP] Japan .......... 2-406207
Nov. 21, 1991 [JP] Japan .......... 3-306346

[51] Int. Cl.[6] .......... G01D 15/18
[52] U.S. Cl. .......... 347/86; 106/20 D
[58] Field of Search .......... 346/140 R, 1.1; 106/20 D, 20 R; 222/576, 95, 108, 103; 206/158, 139; 347/86, 87

[56] References Cited

U.S. PATENT DOCUMENTS

| | | | |
|---|---|---|---|
| 3,833,401 | 9/1974 | Ingram | 117/38 |
| 3,865,767 | 2/1975 | Boberg | 260/23 H |
| 3,907,726 | 9/1975 | Tomiyama | 260/17 R |
| 4,048,410 | 9/1977 | Taylor et al. | 526/22 |
| 4,279,653 | 7/1981 | Makishima et al. | 106/22 |
| 4,599,625 | 7/1986 | Terasawa et al. | 347/87 |
| 4,709,808 | 12/1987 | Balduff et al. | 206/158 |
| 4,723,129 | 2/1988 | Endo et al. | 346/1.1 |
| 4,740,796 | 4/1988 | Endo et al. | 346/1.1 |
| 5,177,660 | 1/1993 | Kilner | 361/220 |
| 5,296,022 | 3/1994 | Kobayashi et al. | 106/20 D |

FOREIGN PATENT DOCUMENTS

| | | |
|---|---|---|
| 2244801 | 9/1972 | Germany . |
| 2313866 | 3/1973 | Germany . |

*Primary Examiner*—A. T. Grimley
*Assistant Examiner*—T. A. Dang
*Attorney, Agent, or Firm*—Fitzpatrick, Cella, Harper & Scinto

[57] ABSTRACT

An ink tank comprising a bag type container which store ink and a case which houses the container, wherein at least one part of the ink tank is made of a degradable plastic.

15 Claims, 8 Drawing Sheets

INK JET HEAD CARTRIDGE, INK TANK CARTRIDGE USING DEGRADEABLE PLASTIC AS PART OF CONSTRUCTION OR PACKAGE THEREOF AND INK JET APPARATUS HAVING FITTING PART FOR THE CARTRIDGES

BACKGROUND OF THE INVENTION

1. Field of the Invention

The present invention relates to an ink jet head cartridge and an ink tank cartridge in which a part of the construction comprises a degradable plastic having a more rapid decrease of physical properties than that of synthetic plastic under disposal environments after use, or a package thereof and an ink jet apparatus having a fitting part for the above cartridges.

2. Related Background Art

An ink jet method disclosed in U.S. Pat. No. 4,723,129 and U.S. Pat. No. 4,740,796 is possible to record high detailed and high quality images with a high speed and a high density, and to be suitable for making compact and coloring. The method has been worthy of remark recently. Representative examples of an apparatus for supplying ink to a recording head used in the above method are: an apparatus where ink is supplied to a fixed type recording head from an ink tank in a replaceable cartridge form through an ink supplying system such as a supplying tube by utilizing negative pressure by waterhead difference and capillary action, and an apparatus having a replaceable cartridge comprising an integrated recording head and ink tank and by developing negative pressure on the ink tank side, ink is supplied by balance between meniscus retention power and negative pressure power of the ink tank.

These catridges are made of synthetic plastics in many cases. For example, an ink tank cartridge, cartridge case, ink receiving bag, ink feeding tube and so on are made of synthetic plastic materials.

Recently, many kinds of synthetic plastic materials have been developed and provided, and materials such as metals have been replaced by synthetic plastic materials. As the result, amounts of synthetic plastic materials used in various industrial fields tend to increase yearly, thereby amounts of synthetic plastic waste increase and the disposal of the waste has been a great social problem in the world.

For example, plastics are produced in an amount of 11,000,000 tons per year in Japan, and in U.S.A. produced about three times the output in Japan. About ⅓ of the output has been disposed. This plastic waste is recovered, and burned or buried. On the other hand, it is left as it is in seas, farms, hills and fields. The recovered and burned plastics generate very high heat, and in some instances the heating value exceeds that of incinerator design, thereby resulting in damage of the incinerator and generation of harmful gases. Treatment by filling-up decreases proper land to be filled-up, and harmful substances are buried simultaneously, thereby harmful substances are concentrated or land subsidence may occur. Moreover, plastics left in the natural world may flow in rivers and seas, and give damage to oceanic life.

Under this circumstance, with the spread of ink jet apparatus and their accessaries, it is considered that disposal of synthetic plastic waste used as their consumption members, replaceable parts, replaceable cartridges of ink tank and ink jet head, or packages for the cartridges, is a matter for consideration relating to environmental problems.

SUMMARY OF THE INVENTION

A main object of the present invention is to provide an ink jet head cartridge, an ink tank cartridge, and a package for the above cartridges which can contribute for improvement of disposal of synthetic plastic waste and environmental contamination by the waste, and give little harmful effect to natural environments under disposal conditions.

Another object of the present invention is to provide an ink jet head cartridge, an ink tank cartridge, and a package for the cartridges which have a superior strength and are electrostatically stable.

A still further object of the present invention is to provide an ink jet head cartridge, an ink tank cartridge, and a package for the cartridges which generate a small calorific value during burning and are superior in the burning treatment.

A still further object of the present invention is to provide an ink jet head cartridge, an ink tank cartridge, and a package for the cartridges of which construction material can be recycled.

A still further object of the present invention is to provide an ink jet apparatus having a fitting portion capable of fitting the above cartridges.

The present inventors made intensive studies in order to be able to contribute for improvement of disposal of plastic material waste and environmental contamination and in order to achieve the above objects. As the result, they have discovered that a cartridge and a package capable of achieving the above objects can be prepared by using a degradable plastic in a part of the construction material of cartridges, packages, and replaceable part of an apparatus.

The present invention provides an ink tank comprising a bag type container which store ink and a case which receives said container, wherein at least one part of said ink tank is made of a degradable plastic.

The present invention also provides an ink jet head cartridge comprising an ink jet head having an ink injection opening and an ink pathway connecting to said ink injection opening, an ink head unit having an ink supplying member for supply ink to said ink pathway, and an ink tank for storing ink which is supplied to said ink pathway by said ink supplying member, wherein at least one part of said ink jet head cartridge is made of a degradable plastic.

The present invention further provides a package for an exchange member of an ink jet apparatus comprising a receiving container main body which has an opening for putting an exchange member in said container, and a cover member which seals said opening of the receiving container main body and makes said exchange member to be the received state, wherein said receiving main body or said cover member or the above two is made of a degradable plastic.

The present invention further provides a member for ink jet recording wherein an exchangeable construction member for ink jet recording or a plastic part of a package has a part made of a degradable plastic.

A degradable plastic has the same characteristics as those of the prior synthetic plastic under ordinary environments used, but degradation of the degradable plastic proceeds under disposal environments, for example, in the presence of microorganism in the soil due to be filled-up.

The above degradable plastic is divided into a biodegradable plastic of which physical properties are decreased by biological action of microorganism and so on and a photodegradable plastic of which physical properties are decreased by irradiation of ultraviolet rays.

Biodegradable plastic refers to a plastic of which bonds are cleaved with more rapid speed than that of a specific control under environmental conditions. Such degradable plastic is divided into the following three kinds.

(1) [Biodegradable plastic] which is a polymer produced by microorganism, a biodegradable synthetic plastic such as a polyester, and a natural polymer such as cellulose, and is completely decomposed into $CO_2$ and $H_2O$ by the action of microorganism.

(2) [Mixed type disintegrable plastic] which is prepared by adding a biodegradable substance such as starch to a plastic and has biodisintegrable property.

(3) [Photodisintegrable plastic] which has photodegradable property by ultraviolet rays by adding some additive in addition to biodegradable property.

The following materials are embodiments of the above degradable plastic.

(1) Biodegradable plastic is divided into a) polymer produced by microorganism, b) natural polymer, and c) biodegradable synthetic polymer from petroleum raw material.

a) Polymer produced by microorganism:

Linear polyesters of 3-hydroxybutyric acid (HB) and 3-hydroxyvaleric acid (HV) (BIOPOL: trade name, produced by ICI, Ltd.). This is substances produced by fermentation of sugar with *Alcaligenes eutrophus,* and the molecule itself is biodegradable.

3-Hydroxybutyric acid (HB), 4-hydroxybutyric acid, polyhydroxyalcanoate (PHA) which is a generic name of polyester compounds produced by microorganism, and polysaccharides comprising $\beta$-1,3-glucan (Cardran: trade name, produced by Takeda Pharamcetutical Co. Ltd.)

b) Natural polymer:

Benzylated wood (cellulose and lignin of wood are treated with caustic soda and reacted with a chemical substance having benzyl group and acetyl group and made plastic), higher fatty acid esterified wood, wheat gluten added with glycerine, glycol, emulsified silicone oil, and urea, cellulose added with chitosan, pullulan, alginic acid, chitin, chitosan carrageenan, and starch.

c) Biodegradable synthetic polymer from petroleum raw material:

Polyester-polyether, polyester-olefin, ethylene/vinyl alcohol copolymer, polyester-amide, nylon (less than decamer), polyester, polyether, polyurethane, copolymer of polyamide and aliphatic polyamide, copolymer of aromatic polyester and aliphatic polyester, polyamide, and polycaprolactone.

2) Mixed type disintegrable plastic:

A mixture of polycaprolactoen (PCL) and polypropylene, a mixture of PCL and nylon-6, a mixture of PCL and polystyrene, a mixture of PCL and polyethylene terephthalate, a mixture of low density polyethylene and PCL, a mixture of PCL and hydrated magnesium silicate, a mixture of corn starch or starch and synthetic plastic such as polyethylene and polypropylene, POLYCREAN (trade name, Archer Daniel Midland Co.), POLYGRADE II, III (trade name, Anpacert Co.), ECOSTAR (trade name, Centlaurence Starch Co.), and TONE (trade name, UCC). ECOSTAR comprises polyethylene dispersed with starch, and the decomposition mechanism comprises a process that the dispersed starch is eaten by microorganism to cause the polymer void, and further the molecular chains are cleaved with peroxides to cause disintegration.

3) Photodisintegrable plastic:

ECO which is ethylene/carbon monooxide copolymer (trade name, Dow Chemical, du Pont, UCC), NACKNAL P (trade name, Japan Unicar Co.), POLYGRADE (trade name, Anpacert Co.), PLASTIGON (trade name, Idea Masters Co.), ECOLIGHT (trade name, Ecoplastic Co.), low density polyethylene (LDPE) added with Fe(III)AcAc, a complex of dithiocarbamate (DNDC) and acetylacetonate (AcAc), LDPE added with Zn(II)DEC and Ni(II)DEC, substituted polyacetin comprising a specific silicon-containing polymer and decomposition accelerator, polyolefin added with xanthone and anthraquinone, acrylate added with oxime methacrylate or a metal complex, oxidized wax added with a metal salt, and ECOSTAR PLUS (trade name, Centlaurence Starch Co.). ECOSTAR PLUS is ECOSTAR added with an additive to make photodegradable (decomposed by Norrish II reaction).

These plastics are not affected at life cycle in their use state, but are decomposed under environments such as in soil or water where microorganisms are active or under environments where ultraviolet rays are irradiated. This decomposition process is entirely biological or photochemical, and biodegradable plastic which is destructed by microorganism, is finally decomposed into carbon dioxide and water.

In mixed type disintegrable plastic, corn starch or starch dispersed in plastic is eaten by microorganism, and bonding of plastic is cleaved, and then the molecular chain is cleaved with peroxides to cause disintegration. Then, the plastic is not completely decomposed different from biodegradable plastic, therefore it should be noted that secondary environmental pollution may occur.

DETAILED DESCRIPTION OF THE PREFERRED EMBODIMENTS

Figure 1:
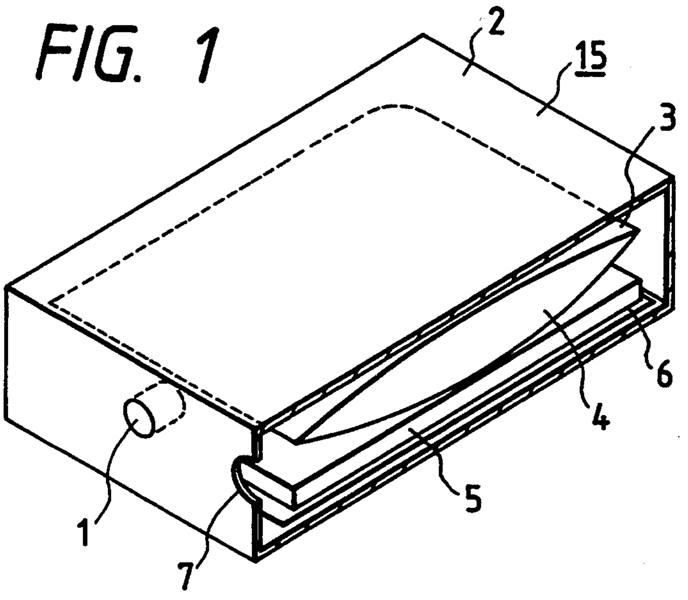
FIG. 1 is a perspective view to illustrate partial cross-section of an ink tank of the present invention.

FIG. 1 is a perspective view to illustrate partial cross-section of a cartridge type ink tank (ink cassette) of the present invention. Numeral 1 is a seal cap made of a elastic member, and is connected to a bag container (ink bag) 3 via an internal tube, and the ink bag 3 is kept in closed state. The seal cap 1 can supply ink into the ink jet apparatus by inserting and connecting an ink feed tube in the apparatus to the seal cap 1. The ink bag 3 is flexible and has ink 4 in its inside. Numeral 2 is an ink cassette casing and is molded corresponding to the cassette receiving portion of the ink jet apparatus by plastic molding in order to prevent leak of ink.

Numeral 5 is a waste ink absorber, and is discarded by recovery motions from a discharge opening of the ink jet apparatus. The waste ink absorber is made of a material having a good water absorbability in order to absorb waste ink supplied from a hole 7 into the cassette 15. Numeral 6 is a relatively soft and non-water absorbing film sheet or a substantially non-water absorbing sheet compared with the waste ink absorber. The waste ink absorber 5 and the sheet 6 are provided if necessary.

The ink casstte 15 capable of receiving waste ink according to this Example is constructed so that the ink bag 3 is directly placed on the waste ink absorber 5, and the sheet 6 is pressure-contacted to the base of the ink cassette 15, thereby poor supply of ink from the ink bag 3 to the ink jet apparatus is surely prevented.

Figure 2:
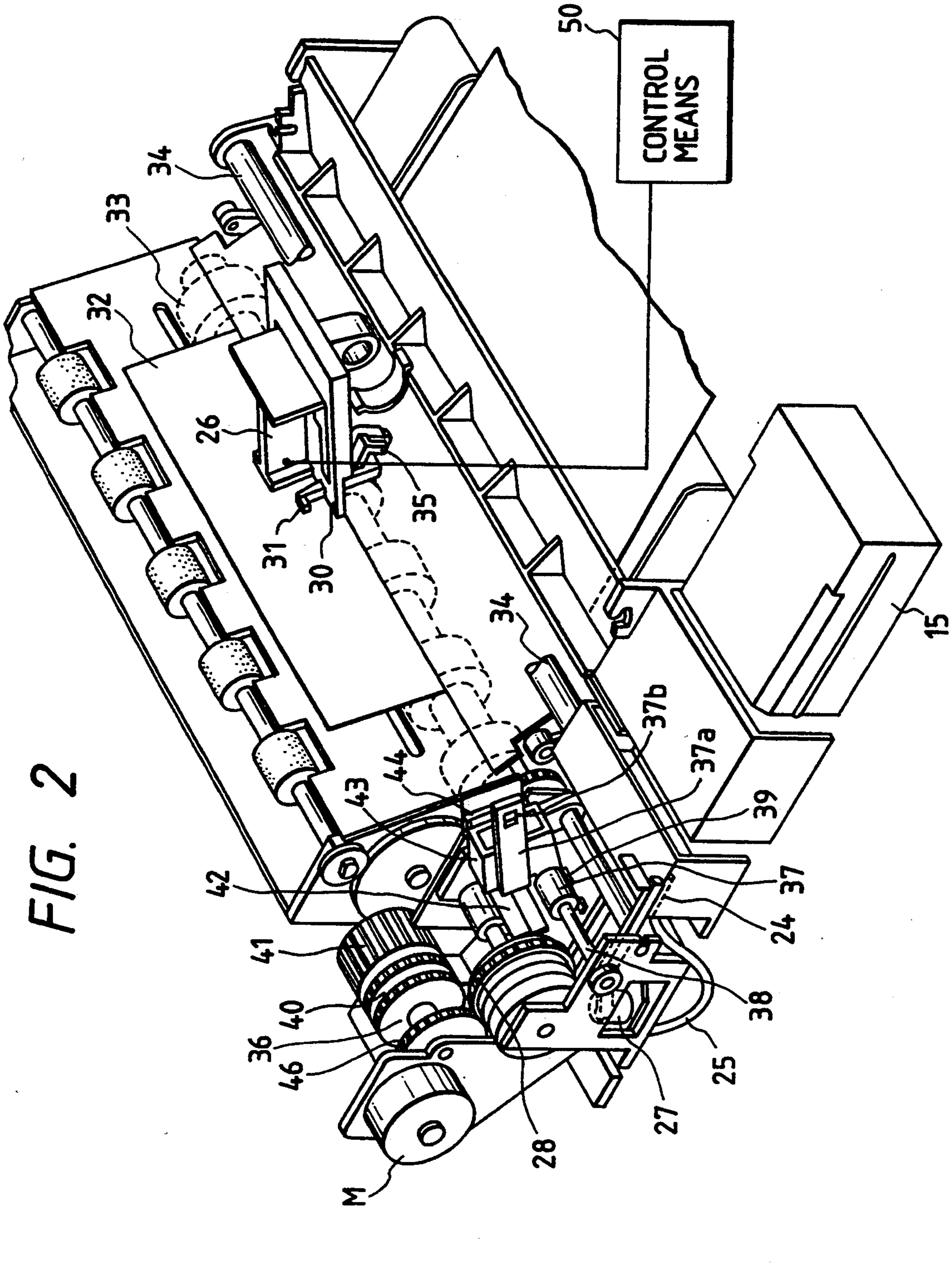
FIG. 2 is an external view of an ink jet apparatus fitted with an ink tank of the present invention.

FIG. 2 is a view to illustrate an ink jet apparaus fitted with the above ink cassette 15. Numeral 26 is an ink jet head which has an internal means for generating energy (a piezoelectric element or an electrothermal transducer) and drives responding to recording information to discharge ink droplets, and 30 is a carriage which moves to the main scanning direction with the loaded ink jet head 26, and 34 is a carriage axis which supports the carriage 30 unrestrictedly, and 32 is a recording medium, and 35 is a feed roller which carries the recording medium 32 responding to recording information.

M is a pulse motor which is a driving source for the fed roller and for automatically supply the recording medium 32 in the cassette, and 37 is a pump carriage which recovers the cap unit or makes it move parallel to the carriage axis 34, and 38 is a guide axis which guides parallel movement of the pump carriage 30, and 39 is a return spring which returns the pump carriage 30 to the right direction of FIG. 2. The pump carriage 37 is provided with an arm portion 37*a* of which front end portion is provided with a hole 37*b* capable of inserting a projection 31 provided to the right side of the carriage 30. When the carriage 30 moves to the left and the projection 31 is inserted into the hole 37*b* and cap 43 covers the surface of the discharging portion of the head 26 (the portion provided with an ink discharge opening), and rotation of the carriage 30 up and down direction is prevented.

A slide gear supporting stand 42 supports a slide gear 28, and is provided so to be able to move along the slide axis to the scanning direction of the carriage 30. Therefore, when the carriage 30 moves and the projection 31 of the carriage 30 is contacted to the arm portion 37*a*, and they move integrally, the slide gear 28 moves to the scanning direction of the carriage and engages with a gear 46 driven by the pulse motor M to be able rotation. In FIG. 2, numeral 41 is a feed gear which delivers driving force to a paper feed gear, and 40 is a gear which delivers driving force for automatically supplying paper, and 36 is a pump gear which delivers suction driving force to a suction pump 27 as a suction recovery device.

Gears 36, 40 and 41 conduct the above drivings by means for delivering driving forces (not shown in FIG.). In this Example, the cap 43 is constructed so that it is moved by the driving force of the gear 28 between the position pressure-contacting to the surface of the injection portion of the head 26 and the separated position. But, the cap 43 may be constructed so that it is moved by the known guide rail between their positions with the carriage movement.

Numeral 44 is a blade which cleans the surface of the injection portion of the head 26, and is control-moved between the cleaning position and the shunted position by the known mechanism (not shown in FIG.), and cleans the head 26 if necessary.

Numeral 25 is a waste ink guiding tube which has end portion 24 for discharging waste ink through the hole 7 into the waste ink absorber 5 in the ink cassette 15.

Numeral 50 is a means for controlling recovery of the head 26 which drives the enery generator of the head 26 in the state that the head 26 is opposite to the cap 43 and conducts discharge control (pre-discharge) of ink different from recording. In addition, the means for controlling recovery of the head 50 controls recovery of ink in the cap 43 into the ink cassette 15 by action of the pump 27, and recovers the head 26 by action of the pump 27 in order to conduct suction recovery in the state that the cap is pressure-contacted to the head 26. The present invention contains at least one of these recovery means.

Ink is supplied from ink cassette 15 to the head 26 by the known supplying method (not shown in FIG.). The ink jet apparatus may have other ink supplying means.

Although the above ink tank cartridge constructing material has used various synthetic plastics previously, in the present invention, at least one part of the constructing member is made of above degradable plastic. For example, the ink tank cartridge is required to have superior durability and shock resistance, so that need to select a material which satisfy the above requirements. Among the above degradable plastics, materials having superior durability and shock resistance include BIOPOL, ECOSTAR, ECOSTAR PLUS, and NACKNAL. Particularly, BIOPOL has superior water resistance and heat resistance (melting point: 180° C.) and has a high safety. Also, BIOPOL is possible to control its melting point and crystallinity by means of controlling its HV content. By increasing HV content, the melting point and crystallinity can be reduced. Moreover, by changing HV content, hardness and toughness of BIOPOL can be controlled, and by adding proper plasticizer, reinforcing filler, and shock absorber, the physical properties of BIOPOL can be controlled. In addition, BIOPOL is applicable to injection blow molding, and has a good processability. On the other hand, ECOSTAR has the characteristics as follows:

1) having a superior strength due to greater particle strength than that of ordinary plastics;
2) being light (density: 1.25);
3) capable of regeneration;
4) difficult to electrostatically charging; and 5) reducing heating value due to small combustion calory per unit.

Accordingly, ECOSTAR is superior for using as ink tank cartridge case. The above materials are degradable plastic having superior shock resistance and so on, and are suitable materials for using as material for ink tank cartridge because they have characteristics to shock relaxation property in the commercial route. Accordingly, it is effective that the case 2 used is at least made of a degradable plastic.

The ink bag 3 and the sheet 6 are required to have a good liquid-contacting property and a proper flexibility. For example, BIOPOL has resistance to tap water and methanol, and is suitable. NACKNAL P has a good water resistance, and starts to disintegrate by irradiating ultraviolet rays, then is suitable for ink bag put in the cartridge case.

As mentioned above, in the case that the case 2 is molded from a degradable plastic, when the used ink tank cartridge is discarded, the ink bag and other parts are taken out from the case 2, and discarded and buried separately. The above process is more preferable to environments. The degradable plastic may be reproduced or have a low combustion calory, then various disposal methods may be used other than filling-up. The ink cartridge of the present invention may take a construction as shown FIGS. 3, 4 and 5. The construction shown in FIGS. 3, 4 and comprises that a plate spring 9 always pushes an ink bag 3 through a flat plate 10, and the flat plate 10 moves to the down direction in FIG. with ink consumption in the ink bag 3.

Figure 3:
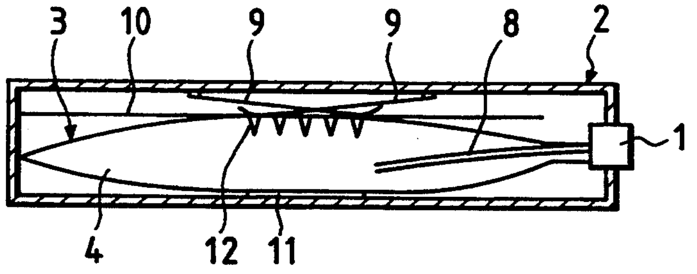
FIG. 3 is a vertical cross-sectional view to illustrate another embodiment of an ink tank of the present invention.
Figure 4:
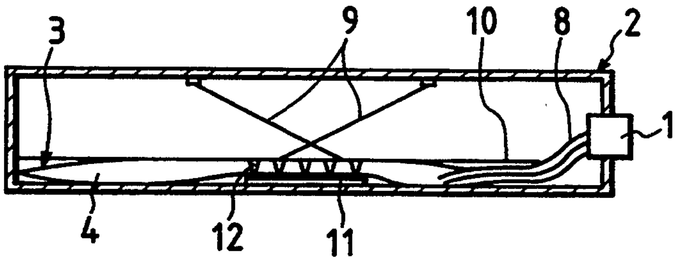
FIG. 4 is a view to illustrate destruction state of an ink bag in the ink tank as in FIG. 3.

In the construction of FIG. 3, as shown in FIG. 4, when ink in the ink bag 3 almost is consumed, nails 12 are pressure-contacted by the plate spring 9 to a plate member 11 made of rubber et. through the flat plate 10 to destroy the ink bag 3 and make the remaining ink 4 in the ink bag 3 flow out in the case 2, thereby supplying water etc. required to decompose by microorganism to the part made of a degradable plastic. Thus, it is also effective that a suitable state for biodegradation is maintained under natural environments such as in soil or artificial environments.

The nails 12 may be provided inside of the ink bag 3, or the nails are formed on the flat plate 10 and the nails are contacted to the ink bag 3 to destroy the bag when ink is consumed, or the nails are provided on the plate member 11 and holes are provided on the flat plate 10, and when ink is consumed, the nails engage with the holes to destroy the ink bag 3.

Figure 5:
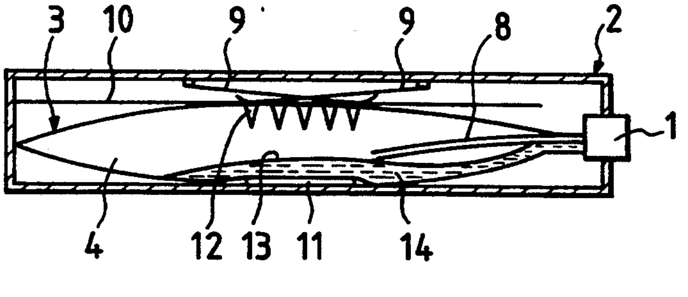
FIG. 5 is a vertical cross-sectional view to illustrate another embodiment of an ink tank of the present invention.

In addition, as shown in FIG. 5, the ink bag 3 may take a double structure which comprises a portion containing ink (an ink bag 3) and a portion maintaining 14 containing microorganism for degradation of the portion made of a degradable plastic or additives for increasing degradation activity. The ink bag 3 may take multistructure of more than triple-structure. In an example as shown in FIG. 5, one bag is included in another bag, but each bag may be included in the case 2 separately, and each bag may have the above functions separately.

From the standpoint that the remaining ink in the ink cassette is utilized to destroy the degradable plastic, in the construction of FIG. 1, in stead of the construction that the sheet 6 separate the waste ink absorber 5 and the case 2, it is also effective that the waste ink absorber 5 and the case 2 made of the degradable plastic can be contacted to utilize ink discarded in the waste ink absorber 5, by taking out the sheet 6 after use of the ink cassette or by winding up the sheet 6 on a suitable member.

Figure 6:
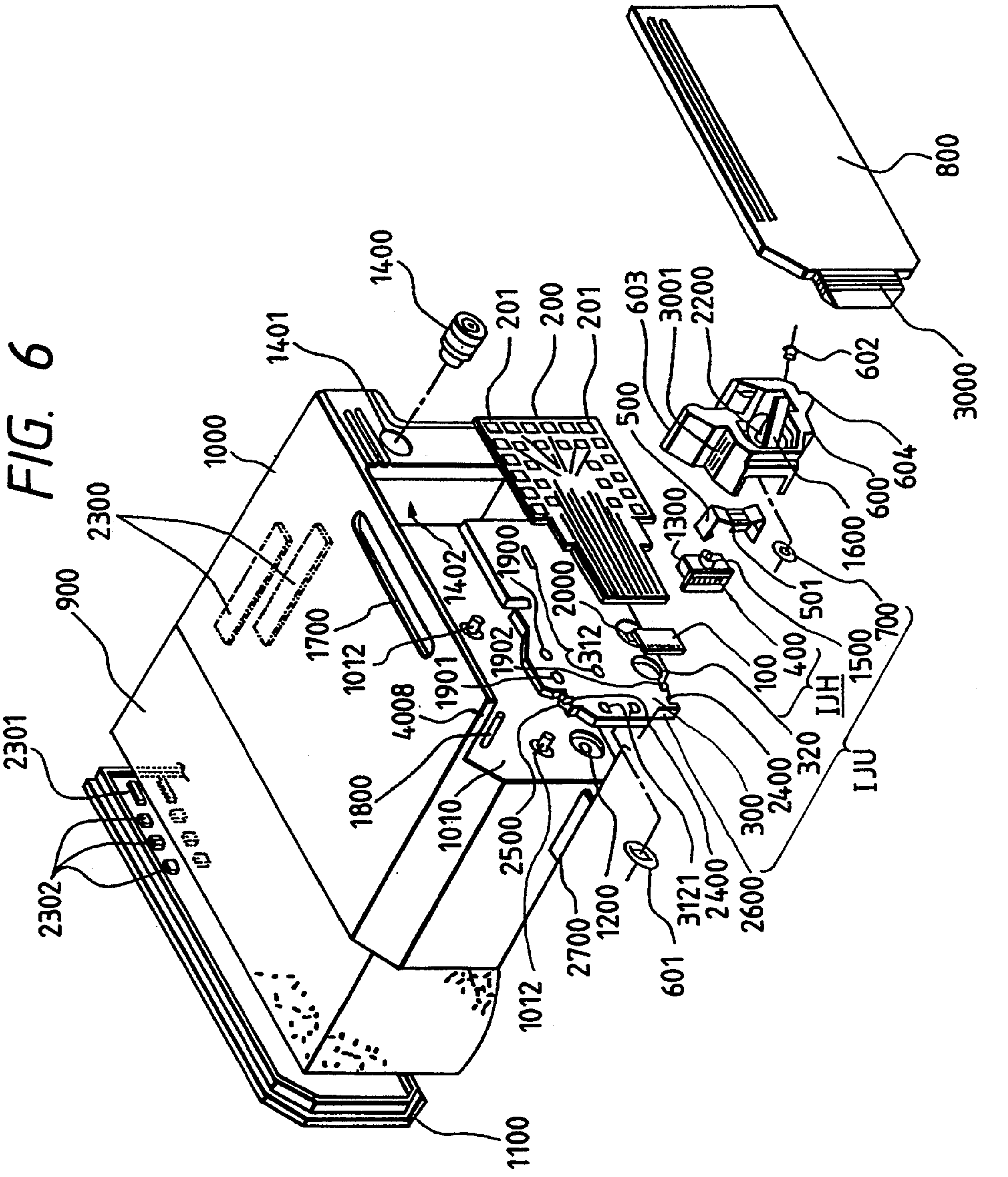
FIG. 6 is a schematic disassembled view to illustrate one example of an ink jet cartridge of the present invention.
Figure 7:
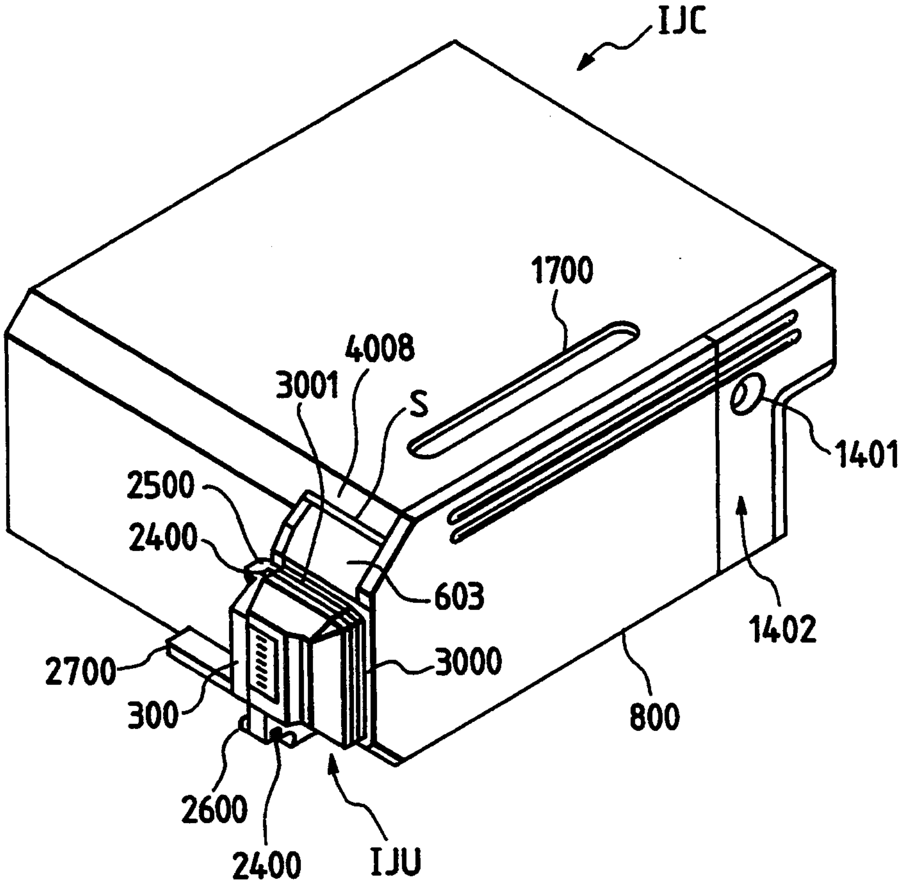
FIG. 7 is an assembled perspective view of the ink jet cartridge of FIG. 6.
Figure 8:
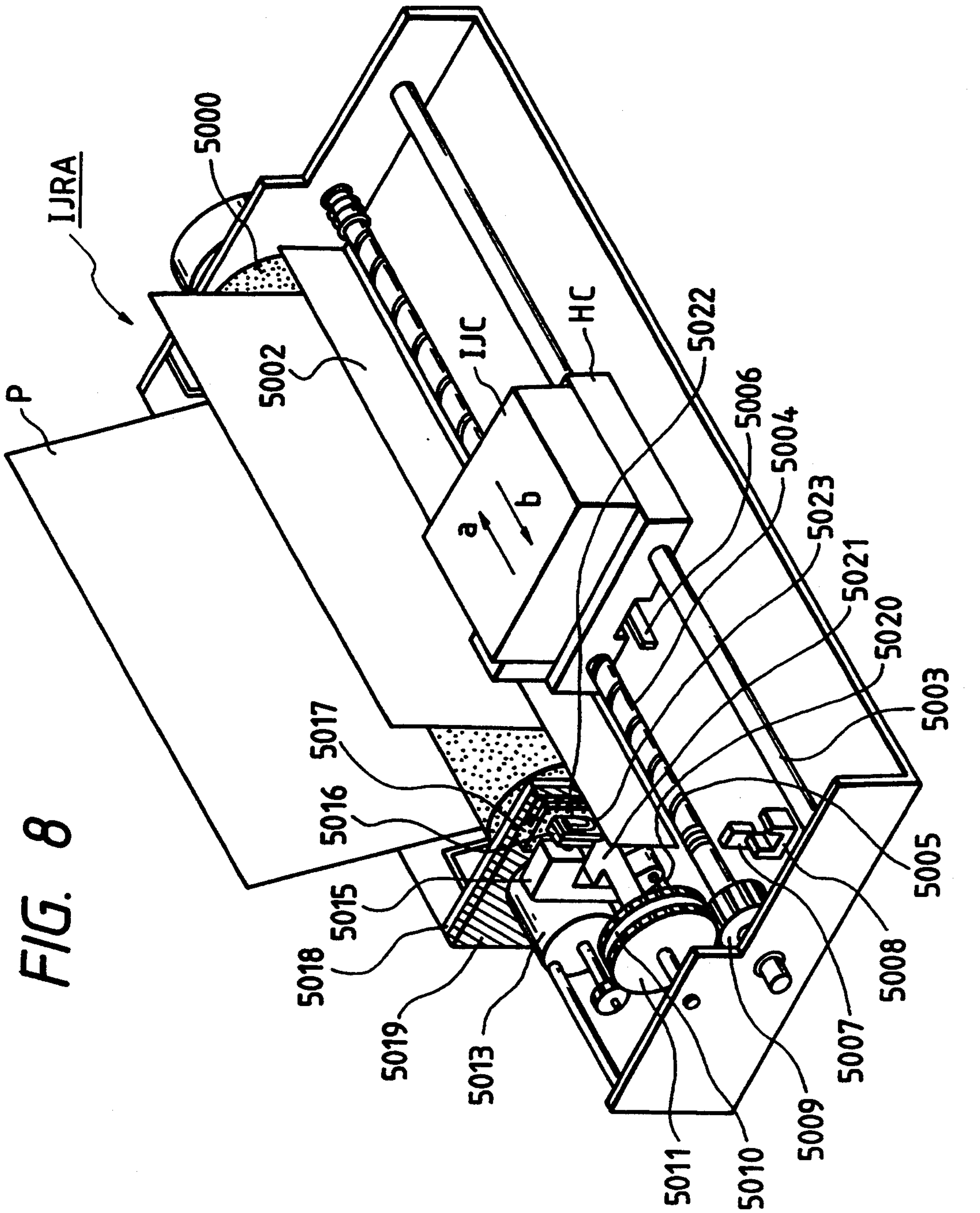
FIG. 8 is a perspective view to illustrate the main part of the ink jet apparatus fitted with the ink jet cartridge of FIG. 7.

Next, an ink jet head cartridge of the present invention is described. An ink jet head cartridge comprises integrally constructed recording head portion and ink tank portion as described below. FIGS. 6 and 7 show a schematic construction of an ink jet head cartridge, and FIG. 8 shows a schematic view of an ink jet apparatus fitted with this ink jet head cartridge.

In this example, as can be seen from FIGS. 6 and 7, an ink jet head cartridge (IJC) has a large ink receiving capacity, and an ink tank (IT) and an ink jet unit (IJU) of which end portion is projected slightly from the front side of the ink tank are integrally constructed. This ink jet head cartridge IJC is fix-supported by known means for defining position and electrical contacts (not shown in FIG.) which are present in a carriage (HC) placed on an ink jet apparatus (IJRA), and is an attachable and detachable type to the carriage (HC).

The constitution of an ink jet head cartridge (IJC) is described below. In FIG. 6, numeral 100 is a heater board in which plural electrothermal transducer lined up on a Si substrate and electric wirings such as Al for supplying electric power to the transducers are formed by film forming method. Numeral 200 is a wiring substrate to the heater board 100 and has wirings corresponding to the wirings of the heater board 100 and a pad 201 which is placed at the terminal of the wirings receives electric signals from the apparatus.

Numeral 1300 is a grooved plate which have bulkheads for separating plural ink pathways and a common liquid chamber for receiving ink to supply ink to the ink pathways. The grooved plate comprises an ink receiving opening 1500 for receiving ink supplied from the ink tank (IT) and introducing ink into the common liquid chamber, and an orifice plate 400 having plural discharge openings corresponding to the ink pathways. They are integrally molded.

Numeral 300 is a supporter made of, for example, metal which supports with a plane the back surface of the wiring substrate 200, and is a base plate of the ink jet unit. Numeral 500 is cap spring which is M shape and press down the common liquid chamber at light pressure with the center of M, and press down concentrically a part of liquid pathway and preferably the area near the discharge opening with a linear pressure by a front portion 501. The leg of the cap spring engages with the back side of the supporter 300 through a hole 3121 of the supporter 300, thereby the heater board 100 and the plate 1300 are engaged in the state that they are sandwiched between the supporter and the cap spring. Thus, the heater bard 100 and the plate 1300 are press fixed by a concentrated force of the cap spring 500 and its front part 501. The supporter 300 has holes for deciding position 312, 1900, and 2000 which engage with two projections for deciding position 1012 for the ink tank (IT) and projections 1800, 1801 for deciding position and for maintaining heat melting. In addition, the supporter 300 has projections 2500, 2600 for deciding position for the carriage (HC) of the apparatus (IJRA) on the back side. Also, the supporter 300 has a hole 320 through which an ink feed tube 2200 can penetrate. Fixing of the wiring substrate 200 to the supporter 300 is carried out with adhesives etc. Concave portions 2400, 2400 of the supporter 300 are provided near the projections for deciding position 2500, 2600 with each other. In an assembled ink jet cartridge (IJC) (FIG. 7), the three sides of the concave portions are present at the extended points of the head end areas formed with plural parallel grooves, thereby preventing the projections 2500, 2600 from foreign substances such as dust and ink. A cover member 800 having the parallel grooves 3000 forms an outer wall of the ink jet cartridge (IJC) and also forms a space storing the ink jet unit (IJU) with the ink tank. The ink supplying member 600 having the parallel grooves forms an ink conduit 1600 connecting to the ink feed tube 2200 as a fixed cantilever, and seal pin 602 is inserted in the ink supplying member in order to ensure capillarity between the fixed side of the ink conduit and the ink feed tube 2200. Numeral 601 is a packing which bonding seals the ink tank (IT) with the ink feed tube 2200, and 700 is a filter provided at the tank side end portion of the ink feed tube.

This ink supplying member is cheap and has a high positional accuracy, and its accuracy is not reduced in the preparation because it is molded. Also, by the ink conduit 1600 as the cantilever, the pressure contact state of the ink supplying member to the ink receiving opening 1500 of the ink conduit 1600 is stabilized when mass production. In this example, only by flowing an adhesive for sealing in the ink supplying member side under the above pressure contact state, more perfect flowing state is surely obtained. Fixing of the ink supplying member 600 to the supporter 300 is carried out by projecting back side pins (not shown in FIG.) of the ink supplying member through the holes 1901, 1902 of the supporter 300 into the supporter 300, and then by heat melt adhering the projected portions to the back side of the supporter 300. The surface for deciding position of the unit (IJU) is accurately obtained because the slightly projected area of the back side heat melt adhered is included in the concave portion (not shown in FIG.) of the side wall surface for fitting the ink jet unit (IJU) in the ink tank.

An ink tank (IT) comprises a cartridge main body 1000, an ink absorber 900, and a cover member 1100 which seals the ink absorber 900 after the ink absorber is inserted from the opposited side to the surface for fitting the unit (IJU) of the cartridge main body 1000.

Numeral 900 is an absorber for impregnating ink and is placed in the cartridge main body 1000. Numeral 1200 is an ink supplying opening for supplying ink to the unit (IJU), and also is an injection opening for impregnating the absorber 300 with ink by injecting ink from the ink supplying opening in a process before the unit is disposed to the portion 1010 of the cartridge main body 1000.

In this example, the portions capable of supplying ink are an opening opened to the atmosphere and the above supplying opening. Because ribs 2300 in the main body 1000 and partial ribs 2500, 2400 of the cover member 1100 forms an area in which air is present in the tank to goodly supply ink from the ink absorber, and the above area is formed over the angle portion most remote from the ink supplying opening 1200 with continuity from an opening opened to the atmosphere 1401, it is important that relatively good and uniform ink supply to the absorber is carried out from the ink supplying opening. This method is practically very effective. The ribs 2300 have four ribs parallel to the direction of carriage movement in the back surface of the ink tank main body, and prevent the absorber from closely contacting to the back surface. Partial ribs 2500, 2400 are provided inside of the cover member 1100 on the extended line corresponding to the ribs 2300, but are divided different from the ribs 2300 to make air presented space increase than the ribs 2300. The partial ribs 2500, 2400 are dispersed in the surface having less than ½ area of the total area of the cover member 1100. By these ribs, ink which is present in the corner area most remote from the ink supplying opening 1200, can be stably and surely introduced to the ink supplying opening side by capillary action. Numeral 1401 is an opening opened to the atmosphere which is provided in the cover member to open the inside of the cartridge (IJC) to the atmosphere. Numeral 1400 is a liquid repellent material which is placed in the opening 1401, thereby ink leak from the opening 1401 is prevented.

The ink tank (IT) as mentioned above has an ink storing space in a form of rectangular parallelepiped, and because its long side is the side surface, the above configuration of the ribs is particularly effective. When the long side is to the direction of carriage moving or the ink receiving space is cubic, ink supply from the ink absorber 900 can be stabilized by providing ribs over the over member 1100. The ink storing space is suitable to have rectangular parallelepiped to store as much ink as possible in the limited space. In order to use the stored ink for recording without waste, it is important that ribs capable of the above funtion are provided at the surface areas near the corner portions. Moreover, the internal ribs of the ink tank (IT) in this example are disposed in almost uniform distribution to the direction of thickness of the ink absorber having rectangular parallelepiped. This construction is important because atmospheric pressure distribution is made uniform and no ink makes remain when ink in the total ink absorber is consumed. Moreover, in a technical idea relating to rib configuration, when a circular arc of which radius is the long side is drawn as the center the position that the ink supplying opening 1200 of the ink tank is projected on the tetragon upper surface of the rectangular parallelepiped, it is important that the above ribs are disposed the surface outside the circular arc so that the atmospheric state is rapidly given to the absorber positioned outside the circular arc. In this case, the opening opened to the atmosphere of the tank is not limited to that of this example so long as atmosphere can be introduced in the areas of the ribs.

In additon, in this example, because the back surface to the head of the ink jet cartridge (IJC) makes plane and the required space assembled into the apparatus makes minimum, and also in storing capacity makes maximum, the apparatus can not only be small-sized, but also exchange frequency of the cartridge (IJC) can be reduced. Utilizing the back portion of the space for integrating the ink jet unit (IJU), a projected portion for the opening opened to the atmosphere 1401 is formed in that portion, and the inside of the projected portion is hollowed, and the space 1402 for supplying the atmospheric pressure to the total thickness of the absorber 900 is formed. By such construction, a superior cartridge which was not achieved in the prior art, could be provided. Because this space for supplying the atmospheric pressure 1402 is more very large space than that of the prior art and the opening 1401 is placed above, the space 1402 can temporarily retain ink and the absorber can surely recover ink although ink leaves the absorber by an accident, thereby providing a superior cartridge (IJC).

The ink tank (IT) is covered with the cover member 800 after fitting to the unit (IJU), then the unit (IJU) is enclosed except under opening. Because the under opening of the ink jet cartridge (IJC) for placing on the carriage (HC) approaches to the carriage, the ink jet cartrdige forms a space which is substantially enclosed on four sides. Accordingly, heat generation from the head (IJH) in this space is effective for keeping warm, but the temperature of the space is slightly increased in the continuous use for a long time. In this example, by providing a slit 1700 which has smaller width than that of the space, on the upper surface of the cartridge (IJC) to aid radiation of heat, increasing of temperature was prevented and also the temperature distribution of the whole unit (IJU) made uniform without being affected by environments.

In the assembled ink jet cartridge (IJC), ink is supplied to the ink supplying member 600 from the inside of the cartridge (IJC) through the ink supplying opening 1200, the hole 320 provided on the supporter 300, and the introduction opening provided in the middle back surface of the ink supplying member. Thereafter, ink is flowed into the common liquid chamber from the discharge opening through a suitable supplying tube and the ink introduction opening 1500 of the plate 400. The above connecting parts for flowing ink provided with a packing which seals the connecting portions, thereby establishing the ink supplying pathway.

In this example, the plate 1300 is made of a resin having a superior ink resistance, and is integrally molded with the orifice plate 400 in a metallic mold.

The above integrated molding parts comprise the ink supplying member 600, the integrated plate 1300/orifice plate 400, and the ink tank main body 1000. Therefore, assembly accuracy is high and also they are mass produced with improved qualities. Desired superior characteristics are obtained because numbers of the parts can be reduced compared with those of the prior art.

In this example, as shown in FIGS. 6 and 7, after assembly, a slit S is formed between the upper surface 603 of the ink supplying member 600 and the end portion 4008 of the roof provided with the slit 1700 of the ink tank (IT). A similar slit as the slit S is formed between the under surface 604 of the ink supplying member and the head side end portion 4011 of a thin plate member to which the cover member 800 is adhered at under part of the ink tank (IT). These slits between the ink tank and the ink supplying member 600 substantially accelerate radiation of heat of the slit 1700, and also prevent the ink supplying member and the ink jet unit (IJU) from suffering from unnecessary pressure applied to the tank (IT).

The above construction of this example provides effective results independently, and also provides composite effects.

FIG. 8 is a schematic view of an ink jet apparatus (IJRA) fitted with the above ink jet cartridge (IJC) according to the present invention. A lead screw 5005 is rotated via driving force transmitting gears 5011, 5009 by linkage of forward and back rotation of a drive motor 5013. The carriage (HC) having a pin (not shown in FIG.) engages with a spiral groove 5004 of the lead screw 5005 and is reciprocated to the directions of arrows a and b. Numeral 5002 is a paper holding plate and presses paper to a platen 5000 over direction of carriage moving. Numerals 5007, 5008 are photocouplers and a means for detecting home position which detects a level 5006 of the carriage in this area and changes the rotation direction of the motor 5013. Numeral 5016 is a supporting member which supports a cap member 5022 capping the front surface of the recording head. Numeral 5015 is a suction means for suction of the inside of the cap and conducts suction recovery of the recording head through an opening 5023 in the cap. Numeral 5017 is a cleaning blade, and 5019 is a member which makes movement of the blade to front and back direction possible. They are supported by a main body supporting plate 5018. The blade may be the known cleaning blade in addition to this configuration. Numeral 5012 is a lever for starting suction and moves with movement of a cam 5020 engaged with the carriage, and the driving force from the driving motor is controlled by the known transmitting means such as clutch transfer.

These capping, cleaning and suction recovery are carried out at the corresponding positions by action of the lead screw 5005 when the carriage is in the home position zone. Desired operations in timing are applicable to this example. The above each constrcution is a superior invention independently and compositely and is a preferable example of construction of the present invention.

In the present invention, at least one part of the ink jet cartridge (IJC) is made of a degradable plastic.

The grooved plate 1300 which is integrated with the orifice plate and forms the ink jet head (IJH) discharging ink by use of thermal energy, is preferably made of a degradable plastic which has water resistance in this example using a water-based ink. Taking into consideration of durability, electrostatic stability and light weight, the case of the ink tank (IT) of the ink jet cartridge (IJC) is preferably made of a degradable plastic. The ink jet cartridge is preferably made of a degradable plastic having electrostatic stability because the cartridge has electric contacts with the apparatus main body.

Additionally, because the ink jet cartridge (IJC) is set on the carriage and scanned in this example, the case of the ink jet cartridge is preferably made of a more light degradable plastic than ordinary plastics.

Because water-based ink is used as ink in this example, it is also effective that the ink supplying member 600 which forms an ink pathway from the ink tank to the head (IJH), is made of a degradable plastic having a good water resistance.

Taking into account plastic waste amount, for example, the cartridge main body 1000, the ink absorber 900 and the cover member 1100 of the ink tank (IT) which occupies most part of the ink jet cartridge (IJC), are preferably made of a degradable plastic. However, the parts made of a degradable plastic are suitably selected according to the design of the ink jet cartridge (IJC).

BIOPOL and NACKNAL P are preferable as a material for the orifice plate constituting the ink jet head (IJH). For example, NACKNAL P is superior in processability, water resistance, inorganic chemical resistance, mechanical properties and heat resistance, then can be used as a material for the orifice plate contacting with ink and the cover plate. BIOPOL, ECOSTAR and ECOSTAR PLUS can be used as a material for the cartridge case. ECOSTAR is used as a material for vicinity of electric contacts of the head cartridge because ECOSTAR has superior electrostatic property, thereby preventing electrostatic destruction.

In addition, a package for an ink jet (head or ink tank) cartridge according to the present invention is described in details with reference to the drawings.

Figure 9:
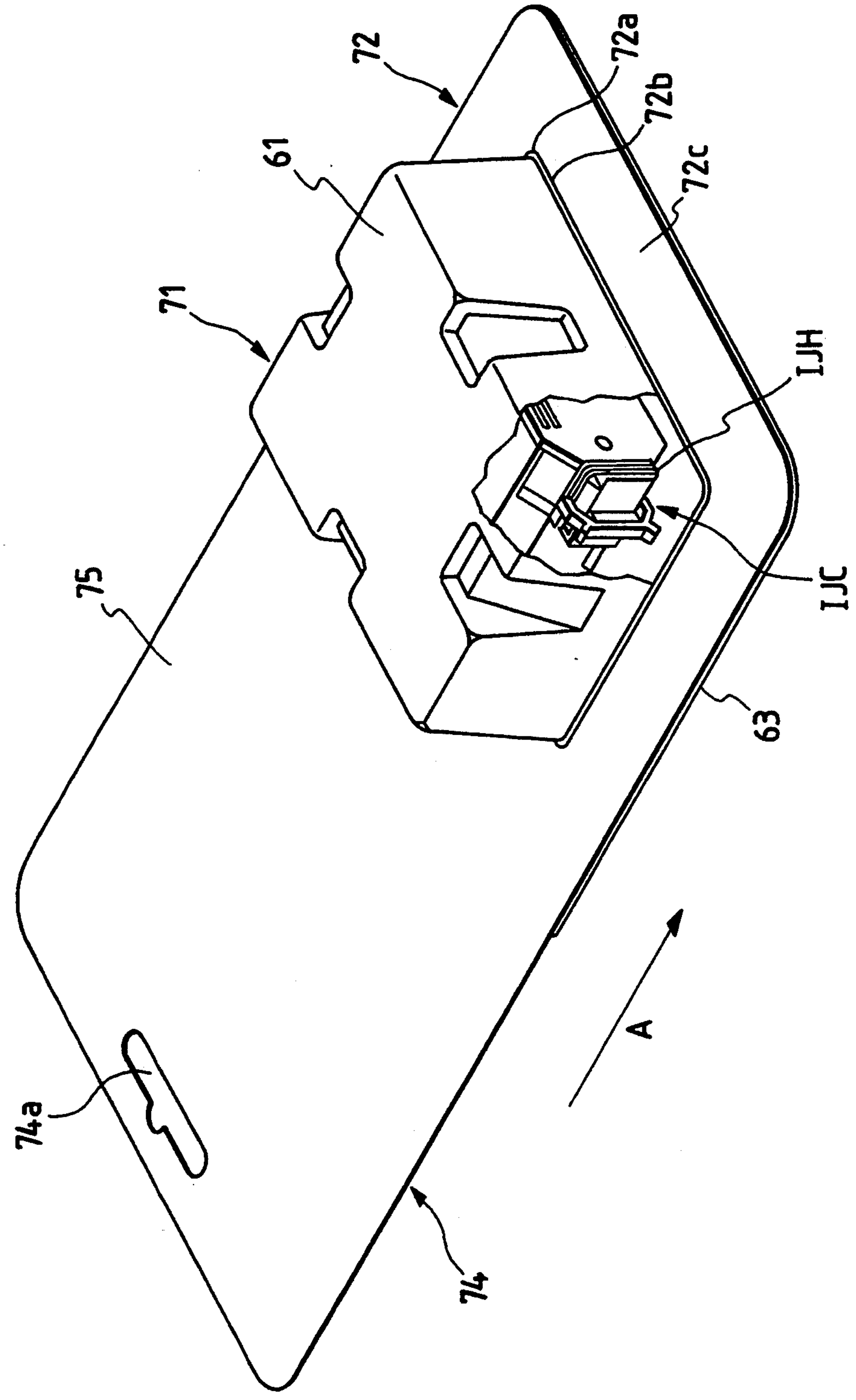
FIG. 9 is a perspective view to schematically illustrate one constitution of a package according to the present invention.
Figure 10:
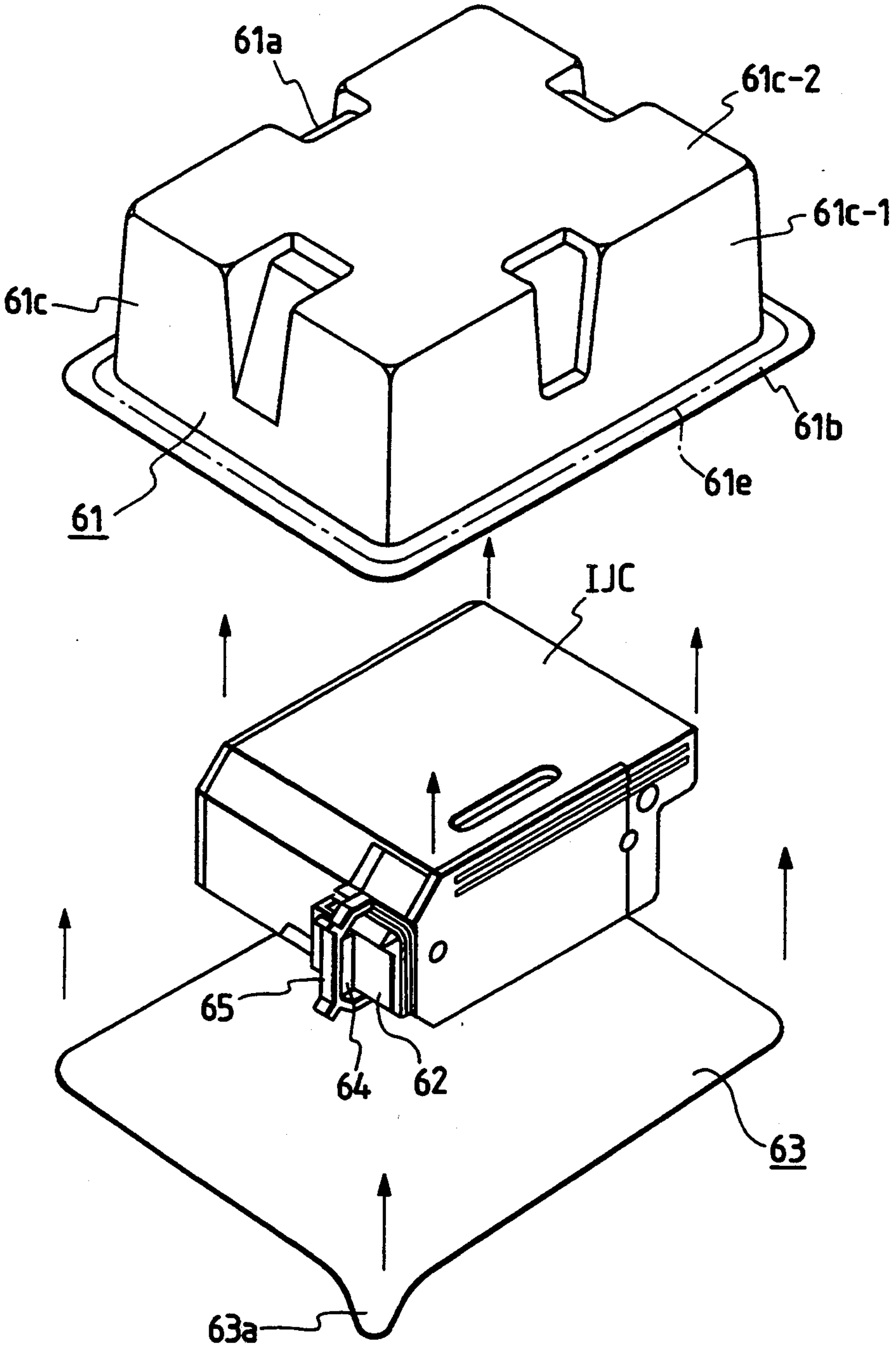
FIG. 10 is a development view to illustrate operation that the ink jet cartridge is put in the receiving container in preparation of the package of FIG. 9.
Figure 11:
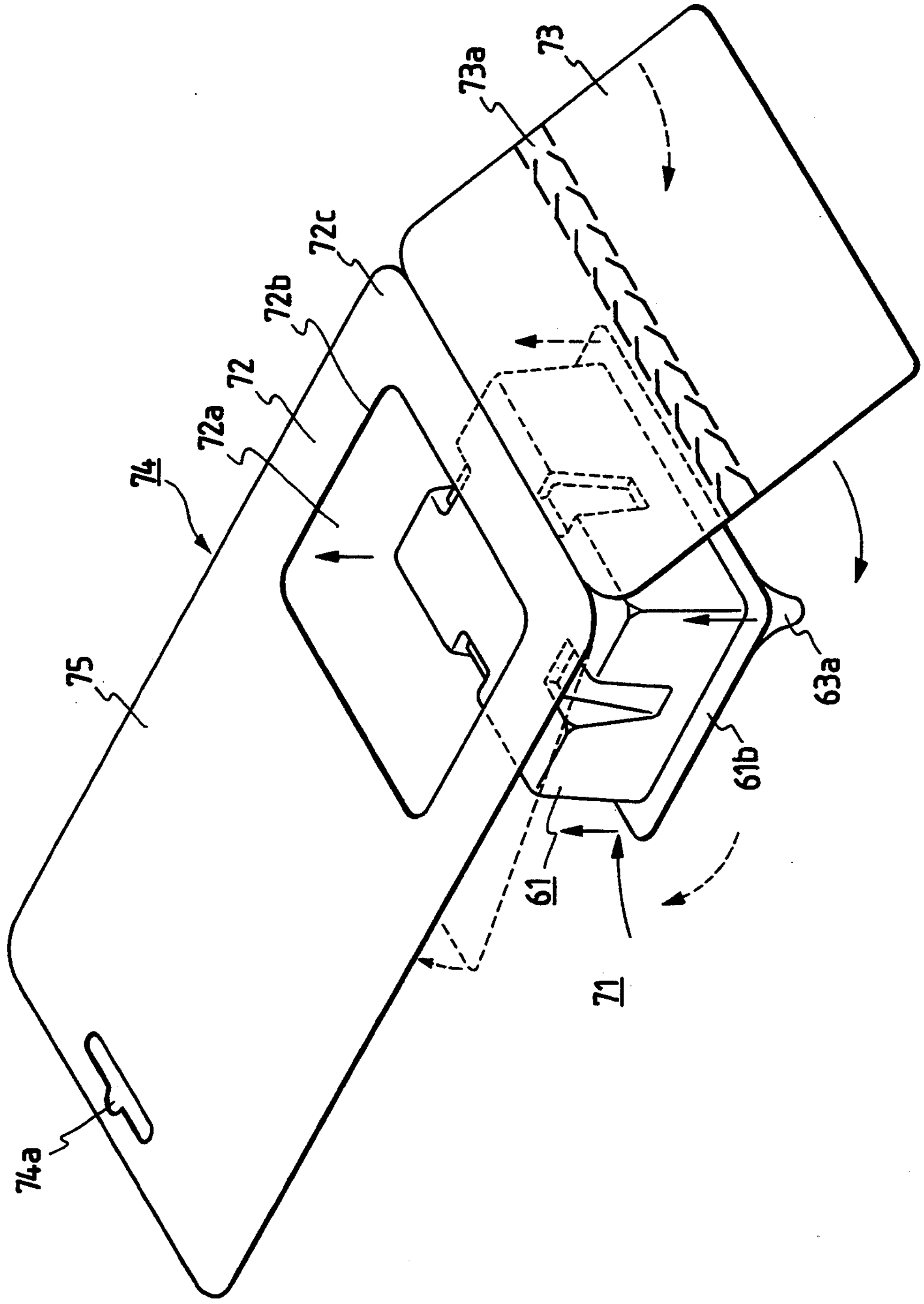
FIG. 11 is an assembled view to illustate the developed supporting member of the package of FIG. 9.

As an example of a package for the ink jet (head or ink tank) according to the present invention, an ink jet head cartridge is described referring to FIGS. 9 to 11. This package has a construction that receiving function for receiving and sealing the ink jet head cartridge (IJC) and supporting function for supporting the receiving container are separated, thereby achieving highly effective protection function to external shock. A flange part of the receiving container is sandwiched and fixed with oppposited two surfaces of paper members, thereby achieving sure supporting of the receiving container. Additionally, a cut part for taking out the receiving container from the supporting member is formed at the supporting zone of the receiving container, and a display area is formed at the different zone, then dispaly which shows methods for taking out the receiving container and for handling, may be effectively described. In the case that the receiving container is fitted to the supporting member, the head part (IJH) of the ink jet cartridge (IJC) makes downward (arrow A direction) to gravity direction, then ink present in the head is gone back from the injection opening, and introduction of air (bubble) from the injection opening into the side of the head part is surely prevented.

This package for the ink jet cartridge comprises a receiving container 71 which has a container main body 61 as a receiving part capable of receiving the ink jet cartridge (IJC) and a flange part **61*b* as a zone where a cover member 63 is joined in order to make the container main body 61 close, and a supporting member 74 which has an opening forming member 72 having an opening 72*a* larger than the periphery of the container main body 61 of container 71 and capable of inserting the container main body 61, having an opening end 72*b* contacting to the periphery of the flange part 61*b* and having surroundings 72*c* of the opening end 73*b*, and a plane member 73 capable of holding the flange part 61*b* with the opening forming member 72 by disposing the plane member opposite to the opening forming member 72**.

The ink jet cartridge (IJC) being received in the above receiving container 71 has a constitution as shown in FIG. 7, for example, and a sheet 62 for preventing ink leak from the injection opening when receiving and a pressing member (cap) 65 having an elastomer 64 for pressing the sheet 62 are provided in the head part (IJH).

The sheet 62 is a sheet for sealing and is large so as cover the whole surface of the injection part of the ink jet head (IJH). For example, by giving a projected part outside the ink jet head end to the sheet 62, the projected part may be utilized as a collar when the sheet is peeled from the ink jet head. Fixing of the sheet 62 to the ink jet head (IJH) is carried out by adding an adhesive between the sheet 62 and the surface 1 of the injection part of the ink jet head (IJH).

The pressing member 65 has a width corresponding to the surface 1 of the injection part of the ink jet head, and has a constitution capable of atachable and detachable fitting to the ink jet head. Two or more of the sheet 62, the elastomer 64 and the pressing member 65 may be integrated.

As shown in FIG. 10, the surface and the surrounding surface of the injection part of the head (IJH) are surely closed with the sheet 62, and that closed state is maintained by elastic deformation of the elastomer 64, thereby a good effect in prevention of ink leak is achieved.

The package for the ink jet head of the present invention comprises the above container main body 61 and the cover member 63 which are integrately jointed to form the package.

The container main body 61 has wall **61*c* which is maintained in non-contact state with the ink jet cartridge (IJC), concave parts 61*a* which are projected from the wall 61*c* to the receiving zone and support the received ink jet cartridge and fix the position of the cartridge, and a flange part 61*b* for integrately jointing with the cover member 63. The injection opening of the ink jet cartridge (IJC) is maintained in non-contact state to the wall in the receiving space. As shown these figures, among four concave parts 61*a***, when the concave part at the injection opening side is deep cut and the injection opening is deep placed in the receiving space, the injection opening is more effectively protected. In addition, in the above configuration, it is prevented that the ink jet cartridge is reversely introduced by user.

The wall **61*c* is required to have a sufficient strength and is formed from such material with a suitable thickness. The thickness of the wall 61*c*** is suitably selected depending on a kind of material, and for example, is more than 0.1 mm, and preferably more than 0.3 mm, and more preferably more than 5 mm. The upper limit of the thickness is less than 1.2 mm.

On the other hand, the concave parts **61*a* preferably have a cushion property to relax or absorbe shock to protect the content. When the concave parts 61*a* are formed so as have the same strength and rigidity as those of the wall 61*c*, the shock which the wall 61*c* is suffered tends to directly transfer to the content, thereby damage of the content may occur. From such standpoint, the concave parts are formed with a relatively thin thickness and is preferably elastic. The thickness of the concave parts 61*a*** is suitably selected depending on a material. For example, the thickness is less than 0.8 mm, and preferably less than 0.6 mm, and more preferably less than 0.4 mm. The lower limit of the thickness is more than 0.05 mm.

By providing the flange part **61*b* in the base of the container main body 61, the container main body 61 is surely jointed with the bottom plate 63 in a simple manner. The flange part 61*b* can be simultaneously molded with other parts when molding integrately with the container main body 61. The thickness of the flange part 61*b* may be the same as that of the wall 61*c*. A rib 61*e* is preferably provided in the flange part 61*b* along the joint zone of the container main body 61 and the cover member 63 to reinforce. This rib 61*e* is provided so as project to the cover member 63, but the projection may be reverse. However, the former is preferable because the container main body 61 is more surely jointed with the cover member 63. By curving corners of the concave parts 61*a* and the wall 61*c*, relaxation to shock is more improved. The curve parts have preferably a relatively large radius of curvature. The radius of curvature is suitably selected depending on the size of the concave parts 61*a***, and is more than 2 mm, and preferably more than 3 mm, and more preferably more than 5 mm.

The configuration of the concave parts **61*a* is suitably selected so that protection of the ink jet cartridge (IJC) and positional fixing of it in the container are effectively conducted. In an example of the figure, the ink jet cartridge (IJC) is supported by four concave parts 61*a***, and this configuration is more preferable. However, numbers of the concave parts are optionally selected.

Larger clearance between the part supporting the ink jet cartridge in the concave part **61*a* and the ink jet cartridge (IJC) is not preferable because the cartridge shakes and moves. On the other hand, its smaller clearance is not preferable because the cartridge is difficultly received in the container 61 and shock from the wall 61***c* is easily transferred. The clearance is suitable selected depending on the structure of the concave parts 61*a* and matching of the concave parts 61*a* with the cartridge, and is 0.5 mm to 3 mm, and preferably 0.5 mm to 2 mm.

A material and thickness of the cover member 63 are selected depending on the weight and strength of the ink jet cartridge (IJC). The cover member 63 comprises a film, sheet or plate made of a degradable plastic, other resin or metal or a laminate containing at least one of the film, sheet and plate. In the case using the laminate as the cover member 63, when the surface layer to the cover member 63 which is not adhered with the container main body 61 (hereinafter referred to as "outer layer") is made of paper, it happens that the cover member is curl deformed by absorption and desorption of moisture of the paper under environmental changes, particularly under humidity change. Therefore, the outer layer is preferably coated with a humidity resistance layer such as alminum, vinylidene chloride, polypropylene and so on to prevent the deformation, thereby it is also possible that peeling force to the adhesion part of the container main body 61 and the cover member 63 is prevented.

As the humidity resistance layer, polypropylene having a thickness of 15 $\mu$m to 100 $\mu$m is most preferable in view of cost and strength.

After the ink jet cartridge (IJC) is put in the container main body 61, jointing of the container main body with the cover member 63 is carried out by various jointing methods. For example, the container main body 61 and the cover member 63 are made of same kind of resin material, and they can be jointed by a method such as heat melting and ultrasonic melting. Also, an easy-peel layer is provided on the zone required to joint in the bottom plate 63, and the jointing may be carried out by utilizing the easy-peel layer. The method utilizing the easy-peel layer has advantages that the cover member 63 can be easily taken out from the container main body 61 when the package is undone and the ink jet cartridge is scarcely damaged. Taking into consideration of humidity maintenance of the content such as humidity resistance and easy unpacking, the easy-peel layer is preferable. As the easy-peel layer, a layer made of various hot melt systems, polyethylene systems and EVEER systems may be utilized.

In handling the cover member 63 preferably has a finger grip part 63*a* which is used when jointing with the container main body 61 is detached. In this example, the finger grip part 63*a* is provided at the position near the injection part of the ink jet cartridge (IJC). However, it is preferably provided at the most remote position from the injection part as far as possible, because hand touch to the injection part which need to be most protected in the ink jet cartridge, is avoided when the cover member 63 is detached from the container main body 61 with the finger grip part 63*a*.

By selecting a constructing material of the package of the present invention, a function which maintains the humidity environment of the content, that is, a function which prevents humidity and evaporation of moisture of the content to outside, is obtained.

In addition, when a raw material sheet other than the part constituting a ceiling 61*c*-2 is vacuum drawn from the ceiling 61*c*-2 of the container main body 61 to the direction of the bottom surface (flange 61*b*) and maile molded to form the concave parts 61*a*, the side 61*c*-1 of the wall 61*c*, and curve parts, etc., the thickness of each part becomes more uniform without developing pinhole, and anti-permeability of moisture of each part is improved.

When the curve parts are not provided in the container main body prepared by vacuum molding, a boundary of the wall of the container main body and the concave part, and a boundary of the wall and the flange are formed as corners having a thin thickness, and it happens that pinhole occurs and damage tends to occur when dropping and anti-permeability of moisture of that parts is reduced. Therefore, by molding the boundary as a curve part, formation of parts having a thin thickness is more effectively prevented, and also a good anti-permeability of moisture is more uniformly obtained, and a surrounding part having stronger dropping shock resistance is obtained.

When the container main body 61 and/or the cover member 63 is made of a transparent or translucent material, the ink jet cartridge 62 can seen through in the package state.

As mentioned above, as shown in FIG. 9, by providing the sheet 62 which covers (seals) the injection opening on the injection opening surface of the ink jet cartridge, evaporation of ink from the injection opening can be significantly reduced, so that humidity of the receiving space is properly maintained, and curl deformation of the cover member can be prevented, and also the condition of the ink supplying pathway from the ink tank to the ink injection opening can be favorably maintained. The shape of the sheet 62 is not limited to the example of FIG. 9, and may take various forms.

Providing the pressing member 65 is more preferable from the standpoint of protection of the injection opening which must be most protected in the ink jet cartridge, because insertion of hand into the injection opening is avoided when user takes out the ink jet cartridge from the container. The pressing member 65 is preferably provided so that the ink jet cartridge does not move and contact to the wall 61*c* of the container main body 61 even if the ink jet cartridge moves within the clearance in the container.

The supporting member 74 has an opening 72*a* larger than the periphery of the container main body 61 and capable of inserting the container main body 61, an opening forming member 72 having an opening end 72*b* contacting to the periphery of the flange part 61*b* and having surroundings 72*c* of the opening end 72*b*, a plane member 73 arranged opposite to the opening forming member 72 and capable of holding the flange part 61*b* with the opening forming member 72, and a display area 75 adjacent to the opening forming member 72.

The above opening 72*a* is possible to be inserted with the container main body 61, and is formed as an opening having almost same shape and size as those of the container main body 61 so that the container main body 61 does not shake after insertion of the container main body. Accordingly, by the presence of the flange 61*b* provided in the whole periphery of the receiving opening side of the container main body 61, the container main body 61 is not detached from the opening 72*a*.

In this example, the opening forming member 72, the plane member 73 and the display area part 75 of the supporting member 74 are made of one paper sheet. Sandwich-holding of the flange part 61*b* of the receiving container 71 is conducted by bending the plane member 73 so that the plane member 73 comes the cover member 63 side of the receiving container 71 inserted into the opening 72*a* of the opening forming member 72, thereby the receiving container 71 is sandwich-fixed and detachment of it is prevented.

The opening forming member 72 and the plane member 73 are jointed with a adhesion area 73*b* formed between the surroundings 72*c* of the opening and the part of the plane member 73 corresponding to the surroundings 72*c* as shown in FIG. 11. Particularly, in this example, the bending area is not the adhesion area 73*b* because the opening forming member 72 and the plane member 73 are bent and jointed.

As shown in FIG. 11, the plane member 73 has a cut part 73*a* which is used to take out the receiving container 71 packaged. In this example, the cut part 73*a* has a construction capable of opening by peeling a belt-like member from one end to another end, that is, is formed as a zipper. The cut part 73*a* is provided, if necessary, and its shape and position are optionally selected.

The package for the ink jet cartridge as constructed as mentioned above is assembled as shown in FIGS. 10 and 11. The ink jet cartridge (IJC) is received in the receiving container 71, and the container 71 is closed with the cover member 63, and the container 71 is inserted into the opening 72*a* provided in the opening forming member 72. At the state, the receiving container 71 is sandwich-held from the cover member side by bending the plane member 73. Namely, the flange part 61*b* of the receiving container 71 is sandwich-held with the opening end 72*b* of the opening forming member 72 and the area of the plane member 73 corresponding to the opening end 72*b*. Next, the package can be assembled as shown in FIG. 9 by adhering the above adhesion area 73*b* such as heat melting.

In the state that the package is hooked with a hook-receiving part 74*a* of the supporting member 74, the receiving container 71 received the ink jet cartridge (IJC) is fitted to the supporting member 74 so that the head part (IJH) constituting the above ink jet cartridge is placed downward gravity direction (arrow A direction) when displaying.

When the head (IJH) is placed upperward gravity direction, air is introduced from the injection opening and the ink pathway and the liquid chamber are filled with bubbles by moving ink downward. These disadvantages are prevented by the former configuration.

Accordingly, when the ink jet cartridge is supported longitudinally as shown in FIG. 9, the head part (IJH) is supported so that it is placed downward gravity direction.

In this example, because the area of the supporting member 74, particularly the area received the receiving container 71 has a double structure, when the external shock by dropping etc. is applied, the shock is effectively relaxed by the supporting member 74. Accordingly, the receiving container 71 is not deformed, and the ink jet cartridge is nicely received and supported without giving any bad effects to the cartridge.

As shown in FIG. 9, the supporting member 74 has a continuous plane at the area adjacent the opening forming member 72, and has a display part 75 in which displays such as label, methods for taking out ink jet cartridge and for its handling can be described. In addition, because the plane member 73 is formed so that it covers only the area in which the opening 72*a* of the opening forming member 72, the surface opposite to the surface positioned at the receiving container, that is the surface provided with the cut part 73*a* of the plane member 73 can also serve as the area of display part 80.

The package having the above construction is disposed generally as waste after taking out the ink jet head cartridge. Particularly, the package itself has no value, then is difficult to recover.

Accordingly, the package is usually disposed as waste with various other wastes unless it is reused, and it may be burned up. Therefore, the package is preferably made of a degradable plastic having a small combustion calory. Of course, each constructing part is required to have the necessary characteristics, respectively. Taking into consideration of them, the receiving container main body 61 of the cartridge is preferably made of BIOPOL or ECOSTAR. Particularly, the ink jet head cartridge preferably has electrostatically stable because it has electric contact parts to input recording signal. Therefore, ECOSTAR having good electrostatic characteristics is preferable as a material for the ink jet head cartridge. On the other hand, the receiving container main body is required to have a good moldability, and therefore is preferably made of a degradable plastic such as BIOPOL, ECOSTAR and ECOSTAR PLUS.

ECOSTAR and ECOSTAR PLUS are made biodegradable or photodegradable by dispersing corn starch etc. in a synthetic plastic. Therefore, for example, a material having the desired characteristics can be obtained by dispersing ECOSTAR or ECOSTAR PLUS in acrylonitrile/butadiene/styrene copolymer resin (ABS resin), polystyrene, polypropylene, polyethylene, poly(ethylene terephthalate), etc. which are ordinary materials for constructing the receiving container. The cover member 63 of the container main body 61, the supporting member 74, etc. may be optionally selected from various degradable plastics which satisfy the above characteristics. The supporting member may be made of paper, and is not necessarily made of a degradable plastic.

Various materials have been described as the material for the above ink jet head cartridge, ink tank cartridge and package for these cartridges, and the material is not limited to them. Degradable plastics which satisfy the required conditions are preferably used as the material. Also, the constitutional part applied is not limited to the above cases, and the degradable plastics are preferably used in the part applicable with other plastics.

Among degradable plastic, for example, the mixed type disintegrable plastic of which degradation state by microorganism, etc. changes depending on the starch content, may cause secondary environmental pollution. Therefore, it is also necessary that the plastic is recover by a special recovery route and recycled or is degradation treated by treating with activated sludge and so on.

The example that the ink jet cartridge (IJC) is received in the receiving container is mentioned above. However, various business machines or various recording media such as toner, ink ribbon, floppy disk and magnetic tape may be received in the receiving container.

EXAMPLE 1

A biodegradable plastic BIOPOL is used as a material for an ink tank cartridge case. As mentioned above, BIOPOL is linear polyesters of 3-hydroxybutyric acid (HB) and 3-hydroxyvaleric acid (HV), and its characteristics can be controlled by controlling the HV content rate. For example, the cartridge case is required to have good strength and stability and a superior ink resistance because it directly contact to the waste ink. This biopolymer has physical properties suitable as a relatively rigid material by controlling the HV content rate to about 5% by weight. With less than 5% by weight of the HV content rate, the biopolymer becomes brittle, and with more than 5% by weight, it becomes flexible. Even if the biopolymer contains more than 5% by weight of HV, its strength may be improved by adding an additive capable of imparting rigidity.

In addition, BIOPOL is suitable to water ink system which is used in ink jet recording because it exhibits resistance to the water ink. For example, a usable ink includes an ink which comprises a suitable composition of a recording agent and a liquid medium depending on the purpose.

The liquid medium includes water and a mixture of water and an organic solvent. For example, this organic solvent includes alcohols having carbon of 1 to 4 such as methyl alcohol, ethyl alcohol, n-propyl alcohol, isopropyl alcohol, n-butyl alcohol, sec-butyl alcohol, tert-butyl alcohol, isobutyl alcohol, etc.; amides such as dimethylformamide, dimethylacetamide, etc; ketones or ketone alcohols such as acetone, diacetone alcohol, etc.; ethers such as tetrahydrofuran, dioxane, etc.; polyalkylene glycols such as polyethylene glycol, polypropylene glycol, etc.; alkylene glycols of which alkylene group has carbon atoms of 2 to 6 such as ethylene glycol, propylene glycol, 1,2,6-hexanetriol, thidiglycol, hexylene glycol, diethylene glycol, etc.; glycerol; and a lower alkyl ester of polyhydric alcohols such as ethylene glycol methyl ether; diethylene glycol methyl (or ethyl) ether, triethylene glycol methyl (or ethyl) ether, etc.

In addition, the ink may be added with various additives such as a viscosity modifier such as poly(vinyl alcohol), celluloses, water-soluble resins, etc., a solubilizing agent such as nitrogen-containing heterocyclic ketones such as N-methyl-2-pyrrolidone, 1,3-dimethyl-2-imidazolidinone, etc., various surfactants, a surface tension controlling agent such as diethanolamine, triethanolamine, etc., and a pH controlling agent such as a buffer solution, etc., if necessary.

EXAMPLE 2

A photodegradable plastic NACKNAL P is used as a material for an ink bag of an ink tank cartridge. NACKNAL P is ECO copolymer formed by copolymerization of ethylene and carbon monooxide and is degraded by Norrish II reaction by irradiation of ultraviolet ray. NACKNAL P is suitable as a material for the ink bag because it is superior in processability, water resistance, inorganic chemical resistance, mechanical characteristics, low temperature characteristics, thermal resistance, etc.

In this case, NACKNAL P can be used in a similar manner as in the prior ink bag by coloring an ink tank case or making it opaque so that the inside of the ink tank cartridge is not directly irradiated with sun light. The ink bag is taken out from the ink tank cartridge to dispose and degraded by irradiation of ultraviolet ray.

EXAMPLE 3

A biodegradable polastic ECOSTAR is used as a material for a package which receives a cartridge and protects the cartridge in its marketing route. ECOSTAR is an additive which is dispersed in a synthetic plastic and makes the synthetic plastic biodegradable. Therefore, ECOSTAR causes the characteristics of the synthetic plastic to efficiently exhibit, and also improves the strength of the synthetic plastic, reduces the combustion calory per unit in the burning up treatment, makes electrostatic charging difficult and makes the synthetic plastic reproducible.

Accordingly, ECOSTAR is suitable as a material for a package which is disposed by user and is difficult to recover. It is suitable to any treatment such as burning up, reproduction and filling up, then it is effective for preservation of the environment because various treatments can be selected.

The present invention is not limited to the above examples. Degradable plastics which satisfy respective characteristics, may be suitably selected and used as materials for the respective constructional elements. Also, plastic parts which are exchanged for maintenance of the ink jet apparatus, may be constructed with a degradable plastic to improve environmental problems.

By constructing at least one part of an ink tank, an ink jet cartridge, a package for the ink jet cartridge and members being exchanged of an ink jet apparatus with a degradable plastic, problems relating to disposing its part waste can be solved.

Especially, by utilizing a degradable plastic for articles of consumption and parts being exchanged, treatment problems of plastic waste disposal relating to problems environmental pollution can be effectively prevented.

The present invention provides an ink jet head cartridge, an ink tank cartridge, and a package for the cartridges which have superior strength and electrostatic stability.

The present invention provides an ink jet head cartridge, an ink tank cartridge, and a package for the cartridges which have little combustion calory in burning up and are suitable for burning up treatment.

The present invention provides an ink jet head cartridge, an ink tank cartridge, and a package for the cartridges of which constructional materials can be recycled.

What is claimed is:

1. An ink tank comprising a storing member for storing ink and a case body for housing the storing member, wherein the storing member is made of a photodegradable plastic of which a degradation is promoted by an irradiation of light and the case body is made of a biodegradable plastic of which a degradation is promoted by microorganism.

2. The ink tank of claim 1, wherein said biodegradable plastic is a completely biodegradable plastic which is completely degraded by biodegradation.

3. The ink tank of claim 1, wherein said biodegradable plastic is a biodisintegrable plastic which comprises a synthetic plastic dispersed with a biodegradable material.

4. The ink tank of claim 1, wherein the storing member is a bag type container for storing ink.

5. The ink tank of claim 1, wherein the storing member is a porous member for storing ink.

6. The ink tank of claim 1, wherein the case body is opaque or colored such that a light is substantially not transmitted into the case body.

7. An ink jet cartridge comprising an ink jet head having a discharge opening for discharging ink and an ink tank integrally communicated with the ink jet head and storing ink supplied to the ink jet head, wherein the ink tank has a storing member for storing ink and a case body for housing the storing member and wherein the storing member is made of a photodegradable plastic of which a degradation is promoted by an irradiation of light and the case body is made of a biodegradable plastic of which a degradation is promoted by microorganism.

8. The ink jet head cartridge of claim 7, wherein said biodegradable plastic is a completely biodegradable plastic which is completely degraded by biodegradation.

9. The ink jet head cartridge of claim 7, wherein said biodegradable plastic is a biodisintegrable plastic which comprises a synthetic plastic dispersed with a biodegradable material.

10. The ink jet head cartridge of claim 7, wherein said head is provided with an electro-thermal transducer which discharges ink by utilizing thermal energy to obtain a desired image.

11. The ink jet head cartridge of claim 7, wherein the storing member is a bag type container for storing ink.

12. The ink jet head cartridge of claim 7, wherein the storing member is a porous member for storing ink.

13. The ink jet head cartridge of claim 7, wherein the case body is opaque or colored such that a light is substantially not transmitted into the case body.

14. An ink tank comprising a bag type container which stores ink and a case which houses the container, wherein at least one part of the ink tank is made of a degradable plastic and a means for supplying degradation which can supply water or microbial cells at the end of ink consumption for obtaining a suitable degradation of the degradable plastic is provided.

15. A package housing for an exchangeable member for an ink jet apparatus comprising a container for housing the exchangeable member, wherein the container has biodisintegrable property caused by dispersing a biodegradable material in a synthetic plastic material.

* * * * *

UNITED STATES PATENT AND TRADEMARK OFFICE

CERTIFICATE OF CORRECTION

PATENT NO. : 5,381,172

DATED : 1/10/95

INVENTOR(S) : Toshihiko Ujita et al

It is certified that error appears in the above-indentified patent and that said Letters Patent is hereby corrected as shown below:

ON TITLE PAGE

In [56] References Cited, Foreign Patent Documents, "Germany" (both occurrences) should read --Fed. Rep. of Germany--.

In [57] ABSTRACT, Line 2: "store" should read --stores--.

COLUMN 1

Line 23, "coloring" should read --colored images--.
Line 65, "accessaries" should read --accessories--.

COLUMN 2

Line 19, "calorific" should read --caloric--.
Line 38, "store" should read --stores--.
Line 57, "is" should read --are--.
Line 67, "soil due to be filled-up." should read --soil of a land fill.--.

UNITED STATES PATENT AND TRADEMARK OFFICE

CERTIFICATE OF CORRECTION

PATENT NO. : 5,381,172

DATED : 1/10/95

INVENTOR(S) : Toshihiko Ujita et al

It is certified that error appears in the above-indentified patent and that said Letters Patent is hereby corrected as shown below:

COLUMN 4

Line 7, "monooxide" should read --monoxide--.
Line 23, "make" should read --make it--.
Line 31, "destructed" should read --decomposed--.
Line 50, "destruction state" should read --the state of destruction--.

COLUMN 5

Line 8, "a" (second occurrence) should read --an--.
Line 27, "casstte" should read --cassette--.
Line 33, "apparaus" should read --apparatus--.
Line 46, "fed roller" should read --feed roller 35--; and "supply" should read --supplying--.
Line 47, "and" should be deleted.
Line 49, "and" should be deleted.
Line 60, "and" should be deleted; and "up" should read --in the up--.

UNITED STATES PATENT AND TRADEMARK OFFICE

CERTIFICATE OF CORRECTION

PATENT NO. : 5,381,172

DATED : 1/10/95

INVENTOR(S) : Toshihiko Ujita et al

It is certified that error appears in the above-indentified patent and that said Letters Patent is hereby corrected as shown below:

COLUMN 6

Line 1, "be able" should read --enable--.
Line 3, "and" should be deleted.
Line 26, "enery" should read --energy--.
Line 45, "need to" should read --one needs to--.
Line 46, "satisfy" should read --satisfies--.
Line 68, "charging;" should read --charge;--.

COLUMN 7

Line 7, "to" should read --of--.
Line 16, "then" should read --and thus--; "ink" should read --an ink--; and "put" should read --to put--.
Lines 21-22, "to environments." should read --for the environment--.
Line 24, "combustion calory," should read --calorie combustion,--.
Line 28, "and comprises that a plate spring 9" should read --comprises a plate spring 9 that--.
Line 30, "FIG." should read --FIG. 4--.

UNITED STATES PATENT AND TRADEMARK OFFICE

CERTIFICATE OF CORRECTION

PATENT NO. : 5,381,172

DATED : 1/10/95

INVENTOR(S) : Toshihiko Ujita et al

It is certified that error appears in the above-indentified patent and that said Letters Patent is hereby corrected as shown below:

COLUMN 7

Line 35, "et." should read --etc.--.
Line 52, "maintaining" should be deleted.
Line 59, "separatedly," should read --separately,--.
Line 60, "separatedly." should read --separately.--.
Line 63, "in stead" should read --instead--.

COLUMN 8

Line 17, "in FIG." should read --in FIG. 3--.
Line 22, "transducer" should read --transducers--.
Line 30, "have" should read --has--.
Line 43, "press" should read --presses--.
Line 44, "press" should read --presses--.
Line 52, "bard" should read --board--.

COLUMN 9

Line 22, "production." should read --produced.--.
Line 40, "opposited" should read --opposite--.
Line 42, "ink" should read --with ink--.
Line 54, "forms" should read --form--.

UNITED STATES PATENT AND TRADEMARK OFFICE

CERTIFICATE OF CORRECTION

PATENT NO. : 5,381,172

DATED : 1/10/95

INVENTOR(S) : Toshihiko Ujita et al

It is certified that error appears in the above-indentified patent and that said Letters Patent is hereby corrected as shown below:

COLUMN 9

Line 55, "goodly" should read --favorably--.
Line 68, "increase than" should read --increase more than--.

COLUMN 10

Line 2, "½ area" should read --½--.
Line 17, "is to" should read --in--.
Line 20, "over" should read --cover--.
Line 31, "makes remain" should read --remains--.
Line 45, "makes plane" should read --makes a plane--.
Line 47, "makes" (both occurrences) should read --is--.
Line 59, "more very large" should read --a much larger--.
Line 62, "although" should read --even if--.

COLUMN 11

Line 2, "cartrdige" should read --cartridge--.

COLUMN 12

Line 16, "constrcution" should read --construction--.
Line 54, "then" should read --and thus--.

UNITED STATES PATENT AND TRADEMARK OFFICE

CERTIFICATE OF CORRECTION

PATENT NO. : 5,381,172

DATED : 1/10/95

INVENTOR(S) : Toshihiko Ujita et al

It is certified that error appears in the above-indentified patent and that said Letters Patent is hereby corrected as shown below:

COLUMN 13

Line 11, "dispaly" should read --display--.
Line 65, "integrately" should read --integrally--.

COLUMN 14

Line 6, "integrately" should read --integrally--.
Line 24, "absorbe" should read --absorb--.
Line 27, "is" should be deleted.
Line 28, "suffered" should read --suffers--.
Line 31, "is" should read --are--.
Line 48, "reverse." should read --reversed.--.
Line 51, "relaxation to" should read --absorbtion of--.

COLUMN 15

Line 1, "difficulty" should read --not easily--.
Line 3, "suitable" should read --suitably--.
Line 30, "jointing" should read --joining--.
Line 31, "jointing" should read --joining--.

UNITED STATES PATENT AND TRADEMARK OFFICE

CERTIFICATE OF CORRECTION

PATENT NO. : 5,381,172

DATED : 1/10/95

INVENTOR(S) : Toshihiko Ujita et al

It is certified that error appears in the above-indentified patent and that said Letters Patent is hereby corrected as shown below:

COLUMN 15

Line 34, "jointed" should read --joined--.
Line 36, "joint in" should read --join--.
Line 37, "jointing" should read --joining--.
Line 42, "of" should be deleted.
Line 49, "jointing" should read --joining or detaching--.
Line 50, "61 is detached." should read --61.--.
Line 55, "need" should read --needs--.
Line 62, "humidity and" should be deleted.
Line 67, "maile" should read --male--.

COLUMN 16

Line 12, "that" should read --those--.
Line 20, "can seen" should read --can be seen--.

COLUMN 17

Line 19, "as" should be deleted.
Line 25, "At the" should read --In this--.
Line 33, "such" should read --by such--.

UNITED STATES PATENT AND TRADEMARK OFFICE

CERTIFICATE OF CORRECTION

PATENT NO. : 5,381,172

DATED : 1/10/95

INVENTOR(S) : Toshihiko Ujita et al

It is certified that error appears in the above-indentified patent and that said Letters Patent is hereby corrected as shown below:

COLUMN 17

Line 36, "received" should read --receiving--.
Line 41, "upperward" should read --upward--.
Line 54, "relaxed" should read --absorbed--.
Line 64, "in which" should read --of--.

COLUMN 18

Line 8, "combustion" should read --caloric--.
Line 9, "calory." should read --combustion.--
Line 11, "into consideration of them," should read --this into consideration,--.
Line 14, "stable" should read --stability--.
Line 49, "recover" should read --recovered--.
Line 67, "contact to" should read --contacts--.

COLUMN 19

Line 45, "monooxide" should read --monoxide--.
Line 60, "polastic" should read --plastic--.

UNITED STATES PATENT AND TRADEMARK OFFICE

CERTIFICATE OF CORRECTION

PATENT NO. : 5,381,172

DATED : 1/10/95

INVENTOR(S) : Toshihiko Ujita et al

It is certified that error appears in the above-indentified patent and that said Letters Patent is hereby corrected as shown below:

COLUMN 20

Line 6, "reproduction" should read --recycling--.
Line 19, "of" should read --from--.
Line 25, "problems" should read --problems of--.
Line 33, "little combustion calory" should read --small caloric combustion--.

COLUMN 22

Line 16, "has" should read --has a--.

Signed and Sealed this

First Day of August, 1995

Attest:

Bruce Lehman

BRUCE LEHMAN

*Attesting Officer*

*Commissioner of Patents and Trademarks*